(12) United States Patent
Lin et al.

(10) Patent No.: US 11,608,429 B2
(45) Date of Patent: Mar. 21, 2023

(54) DISPOSABLE EGGSHELL ECO-FRIENDLY MATERIAL AND MANUFACTURING METHOD

(71) Applicant: LISTEN GREEN TECHNOLOGY CO., LTD., New Taipei (TW)

(72) Inventors: Yi Lin, Hsinchu County (TW); Chin Chih Huang, New Taipei (TW); Yen Wen Wang, New Taipei (TW)

(73) Assignee: Listen Green Technology Co., Ltd., New Taipei (TW)

( * ) Notice: Subject to any disclaimer, the term of this patent is extended or adjusted under 35 U.S.C. 154(b) by 375 days.

(21) Appl. No.: 16/933,266

(22) Filed: Jul. 20, 2020

(65) Prior Publication Data

US 2021/0388181 A1 Dec. 16, 2021

(30) Foreign Application Priority Data

Jun. 11, 2020 (TW) .................................. 109119733

(51) Int. Cl.
*C08K 11/00* (2006.01)
*B29B 9/06* (2006.01)

(52) U.S. Cl.
CPC ................. *C08K 11/00* (2013.01); *B29B 9/06* (2013.01); *B29K 2995/006* (2013.01); *C08K 2201/005* (2013.01)

(58) Field of Classification Search
CPC .............. C08K 11/00; C08K 2201/005; B29K 2995/006; B29B 9/06

USPC ............................................................ 524/10
See application file for complete search history.

(56) References Cited

U.S. PATENT DOCUMENTS

2014/0323616 A1* 10/2014 Liu .......................... C08L 33/10
524/21

FOREIGN PATENT DOCUMENTS

| CN | 101209112 B | 8/2011 |
|---|---|---|
| JP | 3085554 B2 | 9/2000 |
| TW | M592699 U | 4/2020 |

* cited by examiner

*Primary Examiner* — Hui H Chin
(74) *Attorney, Agent, or Firm* — Rosenberg, Klein & Lee

(57) ABSTRACT

A disposable eggshell eco-friendly material and manufacturing method are disclosed. The disposable eggshell eco-friendly material, for volume ratio, includes 50%-80% of calcined eggshell powder, 10%-48% of biodegradable polymer, 1%-5% of natural degradation agent, and 1%-5% of natural binding agent, which are subjected to a mixing and stirring step according to such ratios, and then subjected to a pelletizing step to be first prepared as a plurality of disposable eggshell eco-friendly material pellets, and the disposable eggshell eco-friendly material pellets being then subjected to a shaping and forming step by means of one of film blowing, extruding, vacuum forming, bottle blowing, injecting, and drawing, to obtain a disposable eggshell eco-friendly material product that is disposed of after one time of use.

25 Claims, 20 Drawing Sheets

DISPOSABLE EGGSHELL ECO-FRIENDLY MATERIAL AND MANUFACTURING METHOD

BACKGROUND OF THE INVENTION

1. Field of the Invention

The present invention relates to a disposable eggshell eco-friendly material and manufacturing method, and in particular to a disposable eggshell eco-friendly material and manufacturing method that uses a plastic-reduction eco-friendly substitute substance and contains calcined waste eggshell powder and a biodegradable polymer for fabrication as substitute of disposable plastic product and natural degradation after being disposed, and recycled and regenerated for use.

2. The Related Arts

Disposable plastic products for one time use, such as personal hygiene and cleaning devices of disposable toothbrush and comb or one time use dental mirror, hook, and forceps for dental treatment, or personal epidemic prevention of medical oral mask and N95 mask, or disposable dinning utensils of chopsticks, knives, forks, spoons, and drinking straw that have been consumed in an even large quantity, require the consumption of a large amount of plastics. In addition to being not in compliance with global environmental trends of plastic reduction, the large amount of one-time-use disposable plastic products, if not properly recycled, would be disposed of to create a large amount of waste. In view of the fabrication cost and the characteristics of one time use of such plastic products, attention has been rarely placed on natural degradation or decomposition. Even being made degradable, the plastics material is still consumed with such a large quantity, so that in addition to the high material cost, no effective degradation could be realized for an effect of protection of soil, and further, the known disposable plastic products, when disposed in a large amount as accumulation of waste, could occupy a large area of the land, and the large amount of plastic waste may cause damage to the pH value of the soil, hygiene of the environment, and the soil itself, eventually leading to catastrophe that is of no way to recover. Incineration, if being taken into consideration for such issues, may easily generate a large amount of toxicant gas and carbon dioxide, and also require installation of a large number of incinerators, in combination with air pollution processing measures, all these leading to an increased cost for incineration. In addition, the toxicant gases generated by the incinerators may lead to shortening of the service life of the incinerator due to corrosion of boils and piping, this being a major reason for significant reduction of lifespan of an incinerator, making it uneconomic. This is an issue that must be overcome for practical application.

In addition, edible eggs, such as chicken eggs, duck eggs, and goose eggs, are commonly eaten as food by a large quantity and provide a rich supply of protein to human beings. However, after the edible eggs are generally broken and opened for consuming yolk and protein contained inside, or after other eggs that are not traditionally considered edible, such as ostrich eggs and crocodile eggs, have been hatched, would create a waste of the eggshell, and such remaining of eggshell is disposed abundantly, leading to issues of environmental hygiene for a large number of flies and insects would gather around and breed for consuming the residue of protein and egg membrane, and further, this creates an environmental issues of transportation and accumulation of a large amount of garbage.

Further, for related prior patent documents, US Patent Application Publication US20140323616 discloses "EGGSHELL POWDER COMPOSITIONS AND METHODS OF PRODUCING EGGSHELL POWDER COMPOSITIONS", in which a technique related to a composition of mixture of eggshell powder and polymer. As recited in paragraphs [0011]-[0012] of the patent document, the mixture of the eggshell powder and the polymer is carried out as being set in an environment of low temperature and high gas flow rate to pulverize the eggshell to a desired particle size and to remove an inner membrane from the eggshell. To ensure sanitary and disinfection of the eggshell powder, a complicated process of disinfection and sterilization must be carried out on the eggshell first and this makes the process of manufacturing the composition very complicated and also adds an extra amount of cost, making it uneconomic. Further, if there is any error or incorrectness occurring in the precedent process of disinfection and sterilization of the eggshell, it may make products made of the composition of mixture of eggshell powder and polymer carrying or contaminated by bacteria, because during the manufacturing process of the eggshell powder or the combination of the eggshell powder and polymer, due to possible existence of viruses and bacteria, such as colon bacillus or bird flu virus, on the eggshell itself, contaminating machinery for injecting operations may occurs. This makes it not suitable for making the above-mentioned one-time-use disposable personal hygiene and cleaning devices, such as toothbrush and comb, or one-time-use disposable dental mirror, hook, forceps for dental treatment, or medical oral masks and N95 masks for personal epidemic prevention, or the even large quantity of dinning utensils of disposed chopsticks, knives, forks, and drinking straws, which require severe sterilization. This would impose a significant constraint to the application of such products and lowers the economic value thereof.

Further, Japan Patent Publication No. 3085554 teaches a similar technique that adds an eggshell assisting substance in such a composition to enhance the strength of a product. For example, the Japan patent document teaches, in paragraph [0010], to enhance the strength of a product, a residual material that is obtained after a primary ingredient and/or an effective component of the raw material of food and beverage, mixture with assisting substances, such as grain powder, cellulose, insoluble minerals, seasonings, slat, bone powder, shellfishes, and eggshell also provides a formed product of the present invention. Similar to the previous US patent, the eggshell is directed added into the eggshell assisting substances at a regular temperature or a low temperature, and in addition to the above-mentioned issue of increasing cost of disinfection and sterilization and being hard for complete sterilization, such a formed product also suffers the issue that if there is any error or incorrectness occurring in the precedent process of disinfection and sterilization of the eggshell, it may make products made of the composition of mixture of eggshell powder and polymer carrying or contaminated by bacteria, because during the manufacturing process of the eggshell powder or the combination of the eggshell powder and polymer, due to possible existence of viruses and bacteria, such as colon bacillus or bird flu virus, on the eggshell itself, contaminating machinery for injecting operations may occurs. This makes it not suitable for making the above-mentioned one-time-use disposable personal hygiene and cleaning devices, such as toothbrush and comb, or one-time-use disposable dental mirror, hook, forceps for dental treatment, or medical oral masks and N95 masks for personal epidemic prevention, or the even large quantity of dinning utensils of disposed chopsticks, knives, forks, and drinking straws, which require severe sterilization. This would impose a significant constraint to the application of such products and lowers the economic value thereof.

Further, Chinese Patent Publication No. CN101209112B teaches an eggshell calcium oxide powder, a manufacturing method and an application thereof, which provides a method for producing eggshell powder and applications to effects of resisting pesticide residue and disinfection, preservation, and fresh-keeping for food. For example, the Chinese patent teaches, in paragraph [0006], the present invention is provided to overcome the insufficiency of the known techniques by providing an eggshell calcium oxide powder, such an eggshell calcium oxide powder showing effect of disinfection, preservation, and fresh-keeping, and also helping remove residue of pesticides from the surface of vegetables and fruits, leaving no residue of toxicity that damages human body health. And, a similar description is also recited in paragraphs [0053]-[0054], and paragraphs [0061]-[0062] provide a description concerning applications of food sterilization and suppression of bacteria. However, the prior Chinese patent does not disclose applications and techniques concerning. Further, combination of the minute powdery form eggshell power having a small diameter with the thermoplastic materials that are available in the market is hard or impossible for a skilled artisan to achieve by consulting the prior art document. The prior Chinese patent document does not provide solution of the above problems concerning environmental protection and hygiene that actual applications of the above-discussed one-time-use disposable personal hygiene and cleaning devices, such as toothbrush and comb, or one-time-use disposable dental mirror, hook, forceps for dental treatment, or medical oral masks and N95 masks for personal epidemic prevention, or the even large quantity of dinning utensils of disposed chopsticks, knives, forks, and drinking straws may cause.

In addition, Taiwan Utility Model No. M592699 provides a biodegradable green biomaterial environmental protection drinking straw, which teaches a one-time-use environmental protection drinking straw structure for drinking straws. A composition generally includes maritime inorganic power made of shellfish shells, together with a bio-based polymer, to form a degradable green biological environmental protection drinking straw. The source of the maritime inorganic power made of shellfish shells is the shellfishes, which may not be easily available, and generally depends on the growth rate and growth season, and may just have a limited supply. Further, the process of washing treatment is hard, requiring throughout washing and disinfecting. Further, the maritime creatures have very hard shells, requiring an extended period of time for grinding, consuming a large amount of energy, leading to an excessively high processing cost, and eventually making such a maritime creature inorganic power extremely high in manufacturing cost, making it uneconomic. Further, this utility model requires a great consumption of a large number of maritime creatures of shellfishes, and this may potentially destruct the ecology and environment of the ocean, making it not suit for industrial development.

SUMMARY OF THE INVENTION

The above-mentioned one-time-use disposable personal hygiene and cleaning devices, such as toothbrush and comb, or one-time-use disposable dental mirror, hook, forceps for dental treatment, or medical oral masks and N95 masks for personal epidemic prevention, or the even large quantity of dinning utensils of disposed chopsticks, knives, forks, and drinking straws and the prior patent documents discussed above all surfer potential issues concerning creation of a large amount of plastic garbage and damage to the environment and ecology of the soil.

Thus, the primary objective of the present invention is to provide a disposable eggshell eco-friendly material, which comprises, for volume ratio, 50%-80% of calcined eggshell powder, 10%-48% of biodegradable polymer, 1%-5% of natural degradation agent, and 1%-5% of natural binding agent, which are subjected a mixing and stirring step according to the ratio, and then subjected to a pelletizing step to be first prepared as a plurality of disposable eggshell eco-friendly material pellets, and the disposable eggshell eco-friendly material pellets being then subjected to a shaping and forming step by means of one of film blowing, extruding, vacuum forming, bottle blowing, injecting, and drawing, to obtain a disposable eggshell eco-friendly material product that is disposed of after one time of use, so as to form a disposable eggshell eco-friendly material product showing properties of being non-toxicant contact for human body and food, water resistance, bacterium resistance, fast degradation, and degradation of one-time-use disposition and burying, soil composted as being fertilizing.

Further, in the above-described disposable eggshell eco-friendly material of the present invention, the calcined eggshell powder is selected as an eggshell powder that is subjected to high temperature calcination in a heating rotary kiln of 800° C.-1000° C. for 30 minutes to 60 minutes under a condition that nitrogen flow rate is controlled at 100-300 ml/min and has a mesh number of 400 mesh and an average particle size of 5.236 micrometers ($\mu$m) and a maximum particle size less than 35.316 micrometers.

In the above-described disposable eggshell eco-friendly material of the present invention, the biodegradable polymer is selected as one or a combined polymer of two or three of polylactic acid (PLA), poly-butylene succinate (PBS) polybutylene succinate adipate (PBSA), polybutylene adipate terephthalate (PBAT), polylactide aliphatic polyester copolymer (CPLA), polycaprolactone (PCL), polyhydroxyalkanoate (PHA), starch-based polymer, cellulose acetate, polyvinyl acetate (PVA), polyvinyl alcohol (PVOH), aliphatic-aromatic polyester copolymer, and aliphatic polyester.

In the above-described disposable eggshell eco-friendly material of the present invention, the natural degradation agent is selected as being made of an eggshell membrane.

In the above-described disposable eggshell eco-friendly material of the present invention, the eggshell membrane of the natural degradation agent contains 20% of water, 70% of protein, and 10% of ash.

In the above-described disposable eggshell eco-friendly material of the present invention, the protein of the eggshell membrane of the natural degradation agent has a primary ingredient comprising approximately 70-75% of membrane protein, which has a structure formed by connecting linear structures with lysine, and a remaining portion of the protein is formed of 10% of collagen and 15%-20% of glycoprotein.

In the above-described disposable eggshell eco-friendly material of the present invention, the eggshell membrane of the natural degradation agent is taken as dried eggshell membrane powder obtained from waste eggshell that is subjected to hydrolysis and extraction, allowing complete recycling of eggshell waste, and also making use of a degradation enhancing property of the natural protein of the eggshell membrane powder to increase biodegradation rate.

In the above-described disposable eggshell eco-friendly material of the present invention, the natural binding agent is selected as one or a combination of at least two of agarose, carrageenan, seaweed gum, Arabic gum, guar gum, and konjac gum to bonding between the eggshell powder and the biodegradable polymer.

In the above-described disposable eggshell eco-friendly material of the present invention, the natural binding agent comprises a plant gum, which assists fusion or combination between the calcined eggshell powder and the biodegradable polymer.

In the above-described disposable eggshell eco-friendly material of the present invention, the natural binding agent comprises a dry powder, which assists fusion or combination between the calcined eggshell powder and the biodegradable polymer.

A disposable eggshell eco-friendly material manufacturing method according to the present invention comprises the following steps:

(A) material mixing and stirring, in which, for volume ratio, calcined eggshell powder of 50%-80%, a biodegradable polymer of 10%-48%, a natural degradation agent of 1%-5%, and a natural binding agent of 1%-5% are uniformly mixed and stirred;

(B) preparation for pelletizing, in which the material that has been subjected to material mixing and stirring in Step (A) is subjected to extrusion pelletizing treatment to prepare a plurality of disposable eggshell eco-friendly material pellets;

(C) shaping and forming, the disposable eggshell eco-friendly material pellets prepared in Step (B) is subjected to treatment of one of film blowing, extruding, vacuum forming, bottle blowing, injecting, and drawing at a temperature of 110° C.-180° C.; and (D) forming of disposable eggshell eco-friendly material, in which after the treatment of the shaping and forming step of Step (C), a disposable eggshell eco-friendly material product is formed.

Further, in the above-described disposable eggshell eco-friendly material manufacturing method of the present invention, the calcined eggshell powder of Step (A) is selected as an eggshell powder that is subjected to high temperature calcination in a heating rotary kiln of 800° C.-1000° C. for 30 minutes to 60 minutes under a condition that nitrogen flow rate is controlled at 100-300 ml/min and has a mesh number of 400 mesh and an average particle size of 5.236 micrometers and a maximum particle size less than 35.316 micrometers.

In the above-described disposable eggshell eco-friendly material manufacturing method of the present invention, the biodegradable polymer of Step (A) is selected as one or a combined polymer of two or three of polylactic acid (PLA), poly-butylene succinate (PBS) poly-butylene succinate adipate (PBSA), polybutylene adipate terephthalate (PBAT), polylactide aliphatic polyester copolymer (CPLA), polycaprolactone (PCL), polyhydroxyalkanoate (PHA), starch-based polymer, cellulose acetate, polyvinyl acetate (PVA), polyvinyl alcohol (PVOH), aliphatic-aromatic polyester copolymer, and aliphatic polyester.

In the above-described disposable eggshell eco-friendly material manufacturing method of the present invention, the natural degradation agent of Step (A) is selected as an eggshell membrane.

In the above-described disposable eggshell eco-friendly material manufacturing method of the present invention, the eggshell membrane of the natural degradation agent of Step (A) contains 20% of water, 70% of protein, and 10% of ash.

In the above-described disposable eggshell eco-friendly material manufacturing method of the present invention, the protein of the eggshell membrane of the natural degradation agent of Step (A) has a primary ingredient comprising approximately 70-75% of membrane protein, which has a structure formed by connecting linear structures with lysine, and a remaining portion of the protein is formed of 10% of collagen and 15%-20% of glycoprotein.

In the above-described disposable eggshell eco-friendly material manufacturing method of the present invention, the eggshell membrane of the natural degradation agent of Step (A) is taken as dried eggshell membrane powder obtained from waste eggshell that is subjected to hydrolysis and extraction.

In the above-described disposable eggshell eco-friendly material manufacturing method of the present invention, the natural binding agent of Step (A) is selected as one or a combination of at least two of agarose, carrageenan, seaweed gum, Arabic gum, guar gum, and konjac gum.

In the above-described disposable eggshell eco-friendly material manufacturing method of the present invention, the natural binding agent of Step (A) comprises a plant gum.

In the above-described disposable eggshell eco-friendly material manufacturing method of the present invention, the natural binding agent of Step (A) comprises a dry powder.

In the above-described disposable eggshell eco-friendly material manufacturing method of the present invention, a step of preparing the calcined eggshell powder in Step (A) comprises:

(A1) eggshell waster washing and sterilizing, in which an outside surface and an interior of an eggshell selected from wastes is subjected to washing with water and sterilizing treatment;

(A2) drying treatment, in which the eggshell that has been subjected to the washing treatment in Step (A1) is subjected to drying at a temperature of 110° C.-150° C.;

(A3) grinding and sieving, in which the eggshell that has been subjected to the drying treatment in Step (A2) is placed in a grinding machine for pulverizing and grinding into powder and is then subjected to sieving with a 400-mesh sieve to obtain to obtain primitive eggshell powder;

(A4) calcinating treatment, in which the primitive eggshell powder that has been subjected to the grinding and sieving treatment in Step (A3) is placed in a heating rotary kiln, and the heating rotary kiln is operated at operation conditions of nitrogen flow rate being controlled at 100-300 ml/min, 800° C.-1000° C., a rotational speed of 2-4 RPM, and a time period of 30 minutes to 60 minutes for carrying out calcinating treatment; and (A5) forming eggshell powder in white powder form, in which calcined eggshell powder product in the form of white powder is obtained after the step of calcinating treatment in Step (A4), having an average particle size of 5.236 micrometers and a maximum particle size less than 35.316 micrometers.

In the above-described disposable eggshell eco-friendly material manufacturing method of the present invention, eggshell waster washing and sterilizing of Step (A1) of the step of preparing the calcined eggshell powder in Step (A) is carried out by having the eggshell powder that that has been subjected to 800° C.-1000° C. calcination is mixed with fresh water, a concentration of 0.1-10 g/1000 ml being taken for washing and sterilizing of the eggshell.

In the above-described disposable eggshell eco-friendly material manufacturing method of the present invention, the eggshell of Step (A1) of the step of preparing the calcined eggshell powder in Step (A) is selected as an eggshell of a poultry egg.

In the above-described disposable eggshell eco-friendly material manufacturing method of the present invention, the eggshell of Step (A1) of the step of preparing the calcined eggshell powder in Step (A) is selected as an eggshell of a non-poultry egg.

In the above-described disposable eggshell eco-friendly material manufacturing method of the present invention, the eggshell of Step (A1) of the step of preparing the calcined eggshell powder in Step (A) is handled with an automatic egg opening machine to automatically separate contents of the egg and the eggshell.

In the above-described disposable eggshell eco-friendly material manufacturing method of the present invention, the step of preparation for pelletizing in Step (B) comprises extrusion pelletizing treatment performed with a dual-screw extruder.

The disposable eggshell eco-friendly material and manufacturing method according to the present invention use eggshells that have been disposed of at an extremely large quantity and are easily accessible as a main raw material, and through steps of mixing of calcined eggshell powder, a biodegradable polymer, a natural degradation agent, and a natural binding agent, stirring, pelletizing, and forming to form a product based on recycled use of the large quantity of waste resources. Particularly, the eggshell, after being subjected to calcination at a temperature of 800° C.-1000° C., forms the calcined eggshell powder, which itself has an excellent property of bacterium resistance, and once mixed with the above-mentioned biodegradable polymer, natural degradation agent, and natural binding agent, is subjected to pelletizing to form disposable eggshell eco-friendly material pellets, which is subjected to treatment of one of the forming operations of film blowing, extruding, vacuum forming, bottle blowing, injecting, and drawing to make one-time-use disposable personal hygiene and cleaning tools of toothbrush and comb, or dental tools of one time use of forceps, hook, and mirror for medical treatment use, or nonwoven fabric or melt-blown nonwoven fabric material for use in medical oral mask and N95 mask for personal epidemic prevention purposes, or even dinning utensils of disposable chopsticks, knives, forks, spoons, and drinking straws that have been consumed in an even large quantity, so that during the one time use of such products, providing use for food contact, personal hygiene and cleaning, medical treatment, and epidemic prevention, providing a natural bacterium resisting effect, without adding disinfectant, and such one-time-use disposable products, when disposed in soil after the use thereof, could accelerate automatic degradation to turn into almost organic calcium carbonate as a natural organic fertilizer for fertilizing the soil, preventing the soil environment from being contaminated and damaged, and also help fertilize the soil, reducing the amount of accumulated garbage and protecting the environment, and further, the raw material of the calcined eggshell powder can be mixed with freshwater to make a natural disinfection cleaning solution for washing and cleaning the waste eggshell to prove a use of disinfection and sterilization of the eggshell, making it possible to eliminate the use of chemical disinfectant. And, further, a product so made exhibits an excellent property of water resistance, providing disposable chopsticks, knives, forks, spoons, and drinking straws, which are dinning utensils that have been consumed in an extremely large quantity, with improved water resistance and toughness, in order to ensure such dinning utensils, after being used for a period of time, could maintain usability as being not softened even being soaked in water, thereby improving reliability and quality of such disposed products, and further eliminating the long unsolved problems and drawbacks of the known one-time-use products and those of the above-mentioned patent documents, and further helping preserve the environmental protection and natural ocean ecology, providing a solution for the large quantity of eggshell that have been long unsolved, to thereby further enhance the industrial value and economic value of the present invention.

DETAILED DESCRIPTION OF THE PREFERRED EMBODIMENTS

Figure 1:
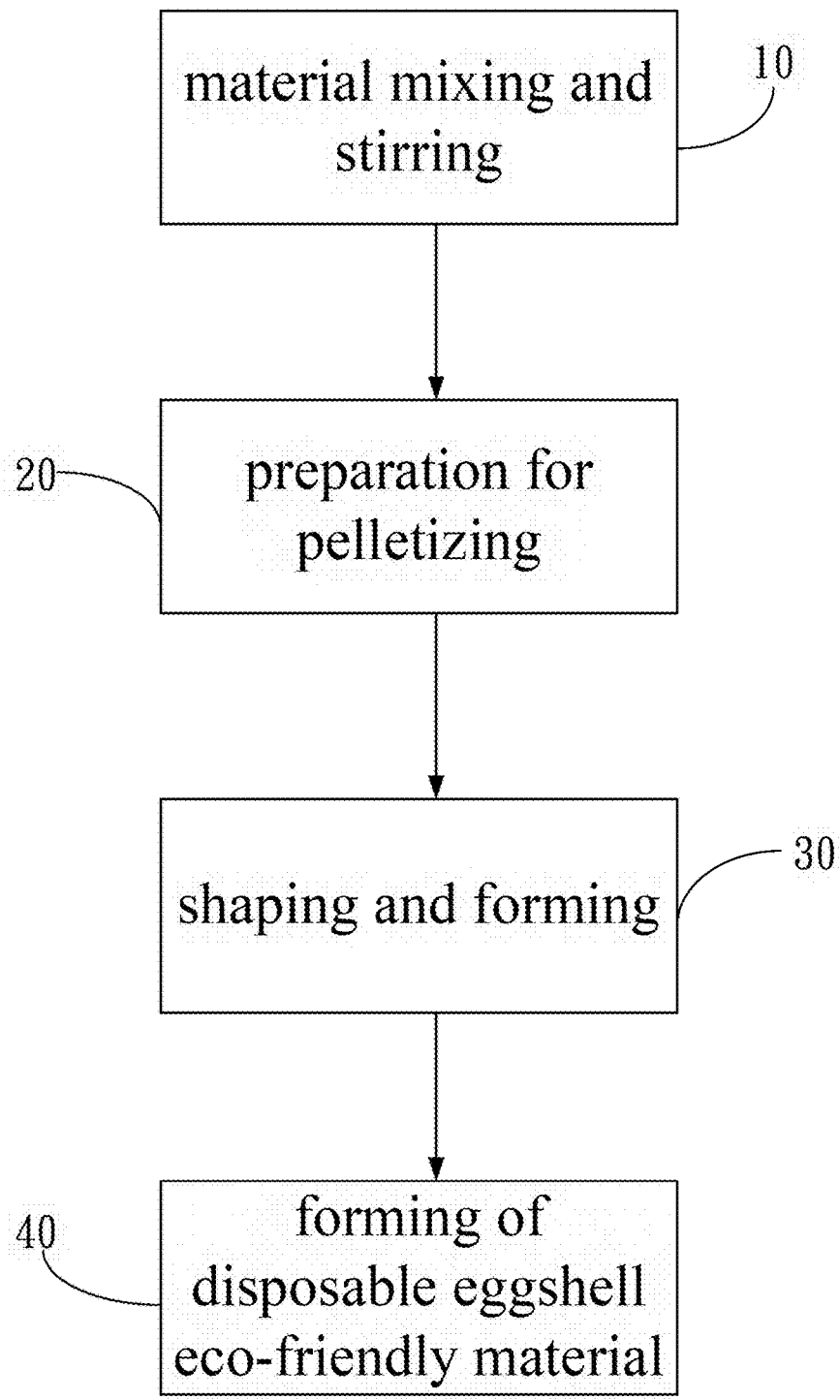
FIG. 1 is a flow chart showing a disposable eggshell eco-friendly material manufacturing method according to the present invention.
Figure 2:
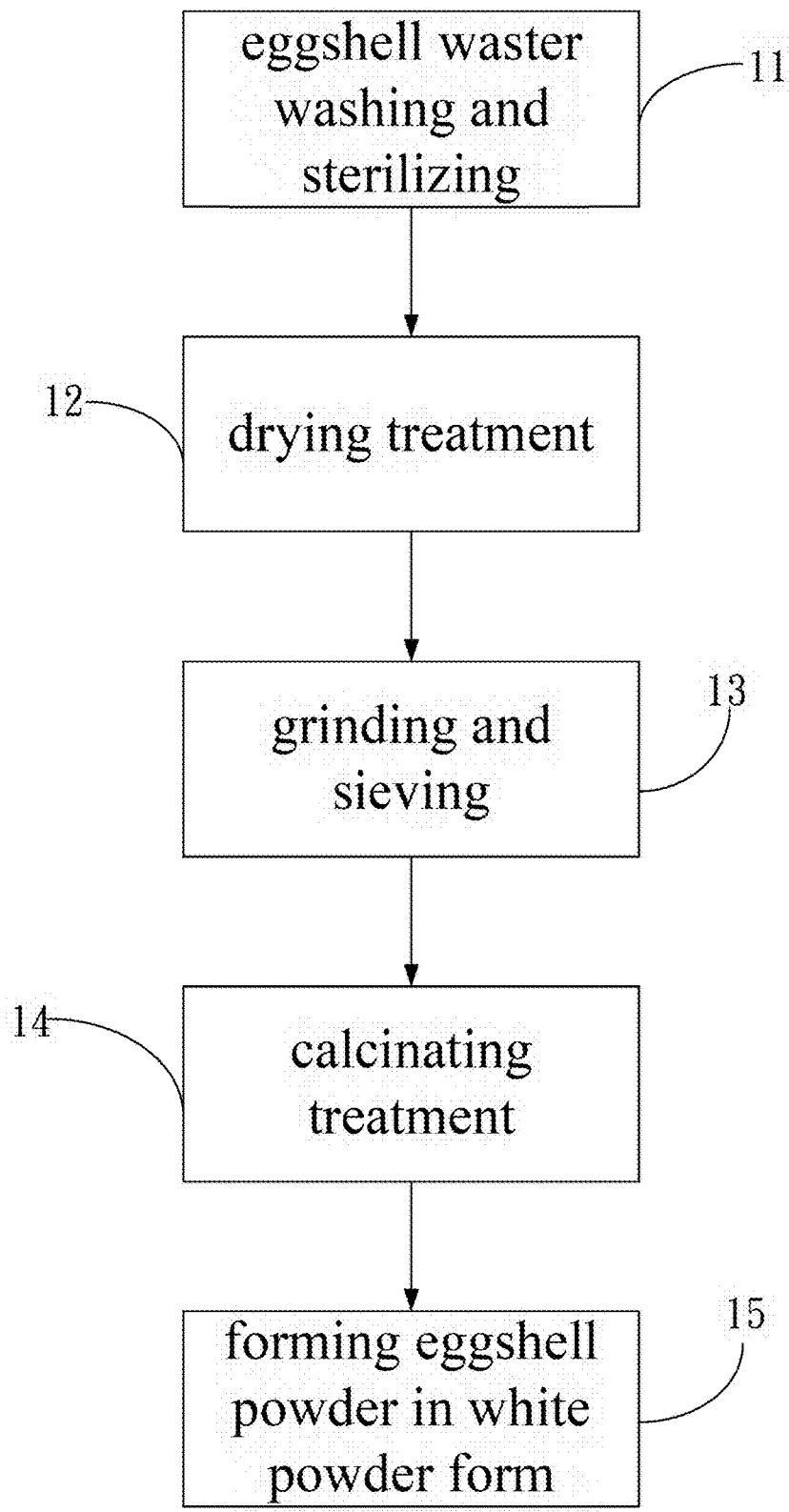
FIG. 2 is a flow chart showing preparation of calcined eggshell powder in the disposable eggshell eco-friendly material manufacturing method according to the present invention.

The present invention provides a disposable eggshell eco-friendly material, which comprises, in volume ratio, calcined eggshell powder of 50%-80%, a biodegradable polymer of 10%-48%, a natural degradation agent of 1%-5%, and a natural binding or adhesive agent of 1%-5% that are subjected to a mixing and stirring step at such ratios, followed by a pelletizing step to make a plurality of disposable eggshell eco-friendly material pellets, and then, the disposable eggshell eco-friendly material pellets are subjected to a shaping and forming step by means of one of film blowing, extruding, vacuum forming, bottle blowing, injecting, and drawing to obtain disposable eggshell eco-friendly material product 100-200 (as shown in FIGS. 3-6).

The above-mentioned calcined eggshell powder is selected as an eggshell powder that is subjected to high temperature calcination in a heating rotary kiln of 800° C.-1000° C. for 30 minutes to 60 minutes under the condition that nitrogen flow rate is controlled to be 100-300 ml/min, showing a mesh number of 400 mesh and an average particle size or particle diameter being 5.236 micrometers and the maximum particle size or particle diameter less than 35.316 micrometers.

The above-mentioned biodegradable polymer is selected as one or a combined polymer of two or three of polylactic acid (PLA), poly-butylene succinate (PBS) poly-butylene succinate adipate (PBSA), polybutylene adipate terephthalate (PBAT), polylactide aliphatic polyester copolymer (CPLA), polycaprolactone (PCL), polyhydroxyalkanoate (PHA), starch-based polymer, cellulose acetate, polyvinyl acetate (PVA), polyvinyl alcohol (PVOH), aliphatic-aromatic polyester copolymer, and aliphatic polyester.

The above-mentioned natural degradation agent is selected as an eggshell membrane. The eggshell membrane of the natural degradation agent contains 20% of water, 70% of protein, and 10% of ash, and further, the protein contained in the eggshell membrane of the natural degradation agent has a primary ingredient of around 70-75% of membrane protein, of which a structure is formed by connecting linear structures with lysine, and a remaining portion of the protein is formed of 10% of collagen and 15%-20% of glycoprotein, and further, the eggshell membrane of the natural degradation agent is taken as dried eggshell membrane powder obtained from waste eggshell that is subjected to hydrolysis and extraction, so that in addition to complete recycling of eggshell waste, the degradation enhancing property of the natural protein of the eggshell membrane powder can be used to increase biodegradation rate.

The above-mentioned natural binding agent is selected as one or a combination of at least two of agarose, carrageenan, seaweed gum, Arabic gum, guar gum, and konjac gum to assist bonding or adhesion between the eggshell powder and the biodegradable polymer, and further, in case that the natural binding agent is in the form of dry powder, assistance can be achieved for fusion or combination between the calcined eggshell powder and the biodegradable polymer, and in case that the natural binding agent is in the form of a plant gum, assistance can also be achieved for fusion or combination between the calcined eggshell powder and the biodegradable polymer.

Referring to FIG. 1, which is a flow chart showing a disposable eggshell eco-friendly material manufacturing method according to the present invention, the disposable eggshell eco-friendly material manufacturing method comprises Steps 10-40, wherein:

(10) material mixing and stirring, in which, for volume ratio, calcined eggshell powder of 50%-80%, a biodegradable polymer of 10%-48%, a natural degradation agent of 1%-5%, and a natural binding agent of 1%-5% are uniformly mixed and stirred;

(20) preparation for pelletizing, in which the material that has been subjected to material mixing and stirring in Step (10) is subjected to extrusion pelletizing treatment with a dual-screw extruder to prepare or make a plurality of disposable eggshell eco-friendly material pellets;

(30) shaping and forming, the disposable eggshell eco-friendly material pellets prepared in Step (20) is subjected to treatment of one of film blowing, extruding, vacuum forming, bottle blowing, injecting, and drawing at a temperature of 110° C.-180° C.; and

(40) forming of disposable eggshell eco-friendly material, in which after the treatment of the shaping and forming step of Step (30), a disposable eggshell eco-friendly material product 100-200 is formed.

The above-discussed step of preparing the calcined eggshell powder in Step (10) of the disposable eggshell eco-friendly material manufacturing method according to the present invention as shown in FIG. 1 comprises Steps 11-15, wherein:

(11) eggshell waste washing and sterilizing, in which an outside surface and an interior of an eggshell selected from wastes is subjected to washing with water and sterilizing treatment, wherein the way of obtaining the waste eggshell is not limited, and in the present invention, an eggshell of a poultry egg is taken as an example, while an eggshell of a non-poultry egg, such as an ostrich egg and a crocodile egg is also considered falling in the scope of the present invention, and further, the eggshell is handled with an automatic egg opening machine to automatically separate the contents of the egg and the eggshell, and ways of water washing and sterilizing of the eggshell are not limited, and in the present invention, as an example, the eggshell powder that has been subjected to 800° C.-1000° C. calcination is mixed with fresh water, a concentration of 0.1-10 g/1000 ml being taken for washing and sterilizing of the eggshell, in order to effectively and cyclically use the eggshell powder itself as a washing and sterilizing material for the surface and interior of the eggshell;

(12) drying treatment, in which the eggshell that has been subjected to the washing treatment in Step (11) is subjected to drying at a temperature of 110° C.-150° C.;

(13) grinding and sieving, in which the eggshell that has been subjected to the drying treatment in Step (12) is placed in a grinding machine for pulverizing and grinding into powder and is then subjected to sieving with a 400-mesh sieve to obtain to obtain primitive eggshell powder;

(14) calcinating treatment, in which the primitive eggshell powder that has been subjected to the grinding and sieving treatment in Step (13) is placed in a heating rotary kiln, and the heating rotary kiln is operated at operation conditions of nitrogen flow rate being controlled at 100-300 ml/min, 800° C.-1000° C., a rotational speed of 2-4 RPM, and a time period of 30 minutes to 60 minutes for carrying out calcinating treatment;

(15) forming eggshell powder in white powder form, in which calcined eggshell powder product in the form of white powder is obtained after the step of calcinating treatment in Step (14), having an average particle size of 5.236 micrometers and a maximum particle size less than 35.316 micrometers.

Figure 3:
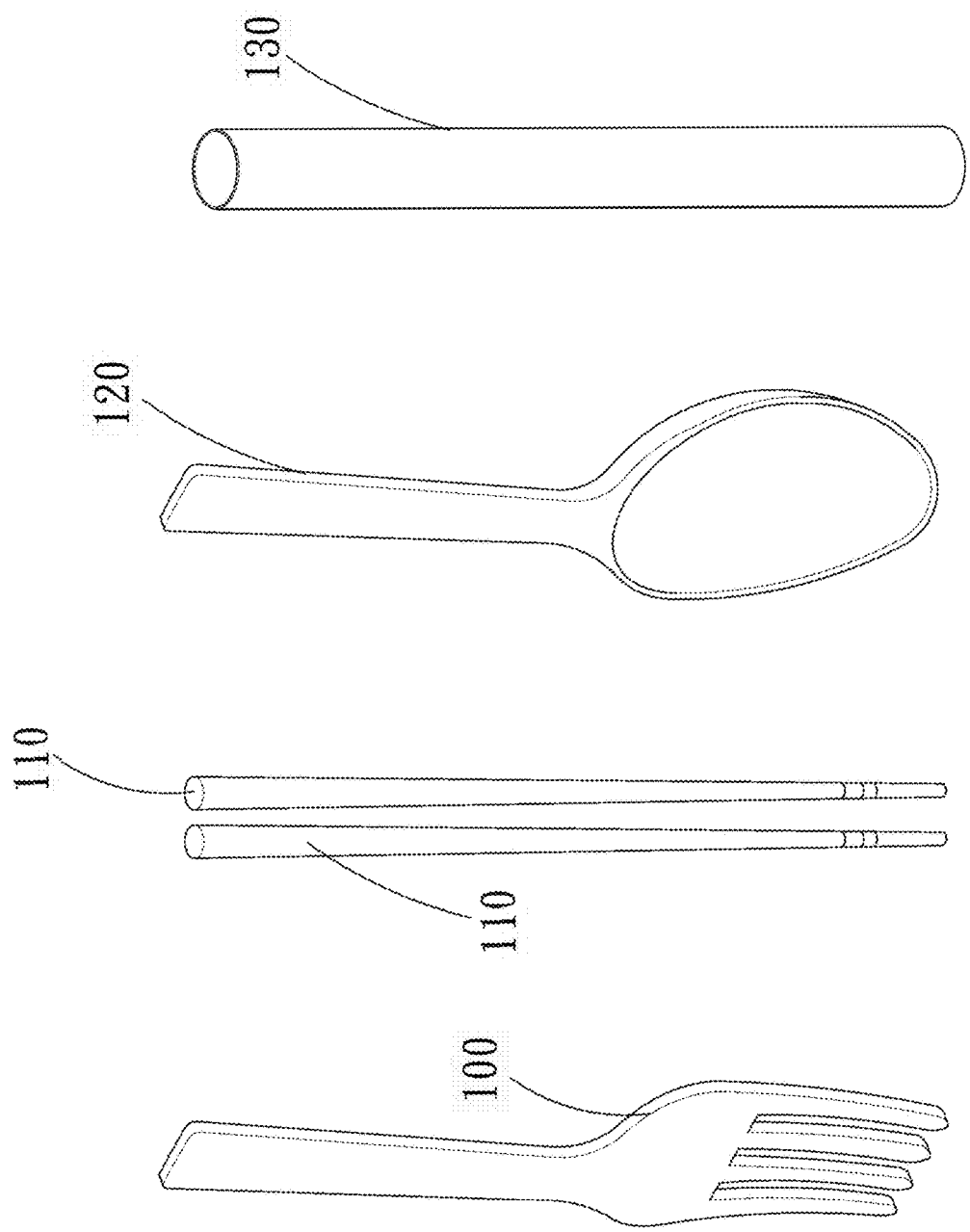
FIG. 3 shows first application examples of disposable eggshell eco-friendly material products according to the present invention.
Figure 4:
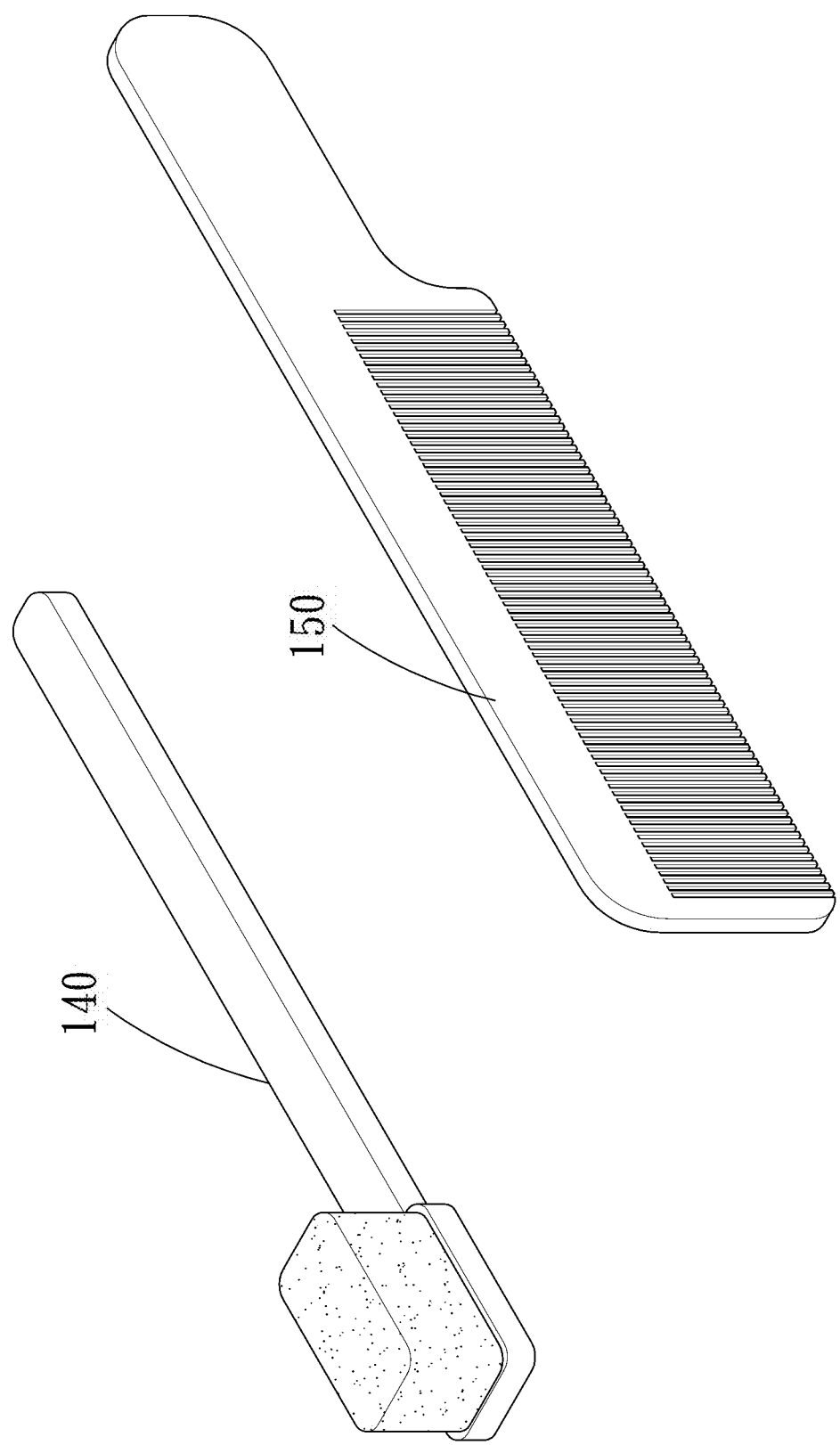
FIG. 4 shows second application examples of disposable eggshell eco-friendly material products according to the present invention.
Figure 5:
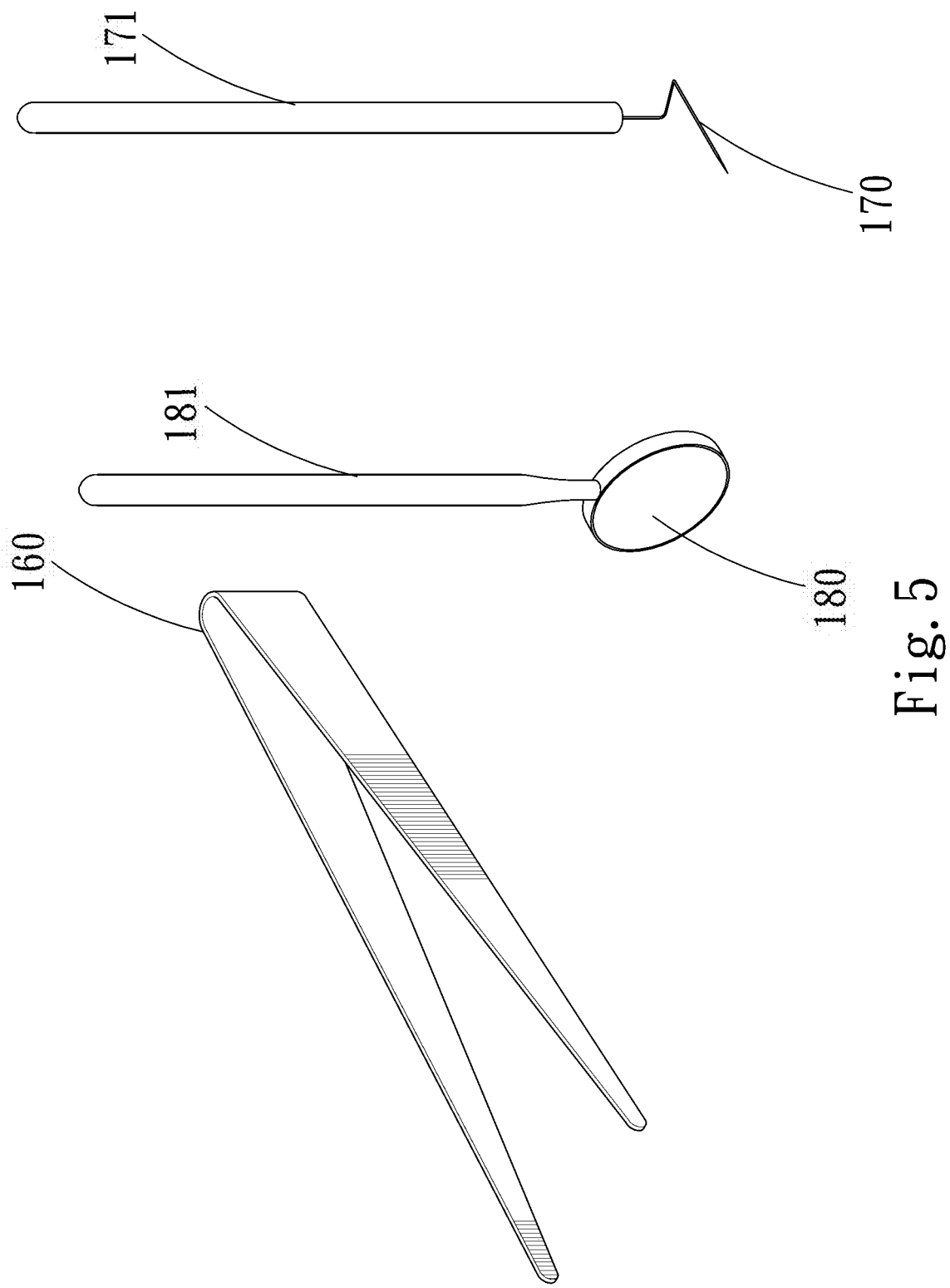
FIG. 5 shows third application examples of disposable eggshell eco-friendly material products according to the present invention.
Figure 6:
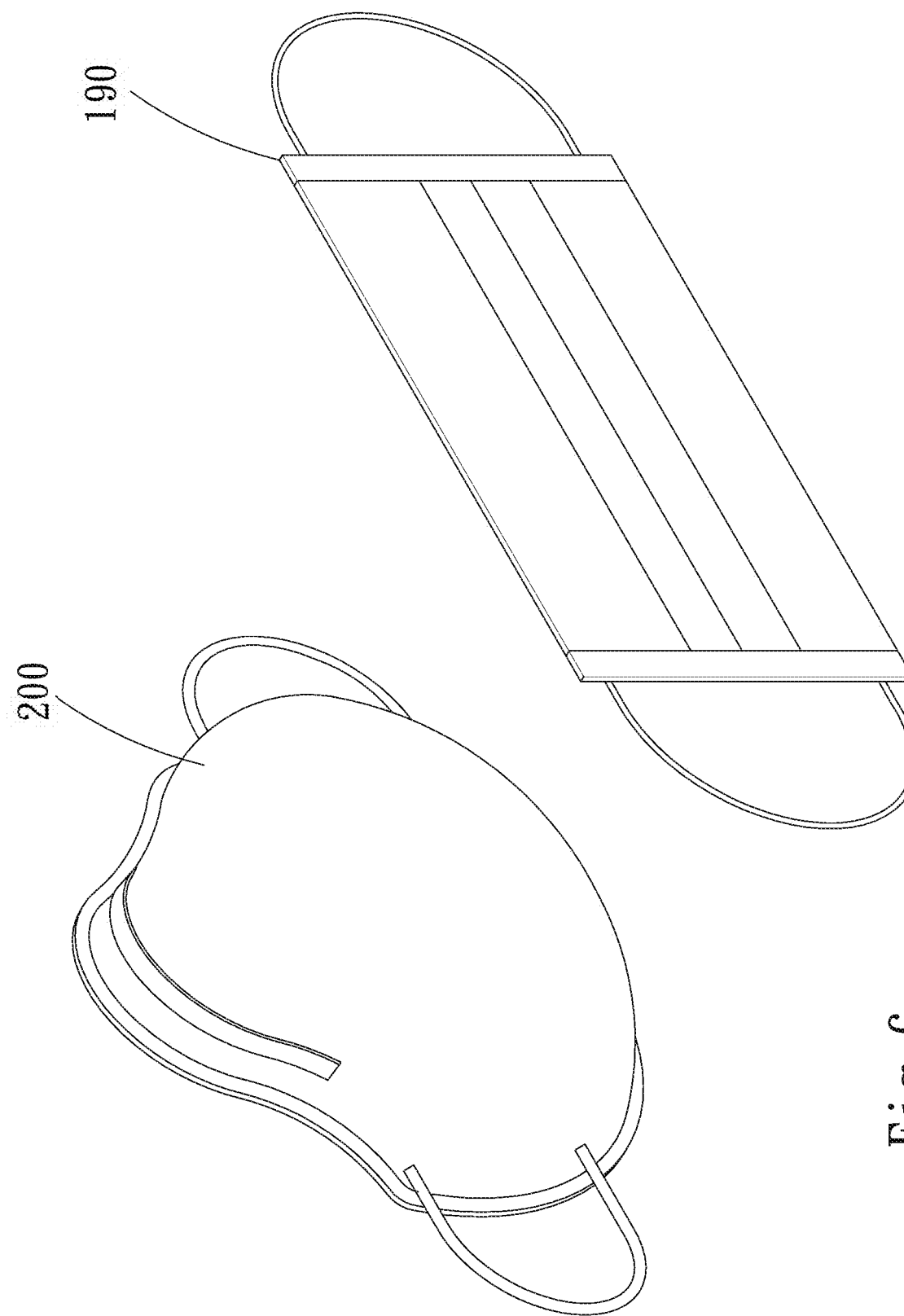
FIG. 6 shows fourth application examples of disposable eggshell eco-friendly material products according to the present invention.

Referring to FIGS. 3, 4, 5, and 6, first to fourth application examples of disposable eggshell eco-friendly material products 100, 110, 120, 130, 140, 150, 160, 170, 180, 190, 200 manufactured with Steps 10-40 of the disposable eggshell eco-friendly material manufacturing method according to the present invention as shown in FIG. 1 are shown, wherein the disposable eggshell eco-friendly material products 100, 110, 120, 130 of the first application example shown in FIG. 3 are personal dinning utensils including a fork, chopsticks, a spoon, and a drinking straw, which are one-time-use disposable products; the disposable eggshell eco-friendly material products 140, 150 of the second application example shown in FIG. 4 are personal hygiene and cleaning devices, including toothbrush and comb, which are one-time-use disposable products; the disposable eggshell eco-friendly material products 160, 170, 180 of the third application example shown in FIG. 5 are personal dental instruments including forceps, hook, and mirror, which are one-time-use disposable products, among which the disposable eggshell eco-friendly material product 170, 180 of hook and mirror are provided to demonstrate application to a grip handle 171, 181; and the disposable eggshell eco-friendly material products 190 and 200 of the fourth application example shown in FIG. 6 are for personal epidemic prevention, including a medical oral mask and an N95 mask, which are one-time-use disposable products, a specific embodiment of the two being a nonwoven fabric layer or a meltblown nonwoven fabric material layer (not shown). The disposable eggshell eco-friendly material products 100-200 of the present invention as shown in FIGS. 3-6 may have applications other than the above-mentioned personal dinning utensils of fork, chopsticks, spoon, and drinking straw, personal hygiene and cleaning tools of toothbrush and comb, personal dental instruments of forceps, hook, and mirror, and personal epidemic prevention of medical oral mask and N95 mask, and all types of one-time-use disposable products that are put in contact or non-contact with human bodies are considered failing in the scope of the present invention.

Figure 7:
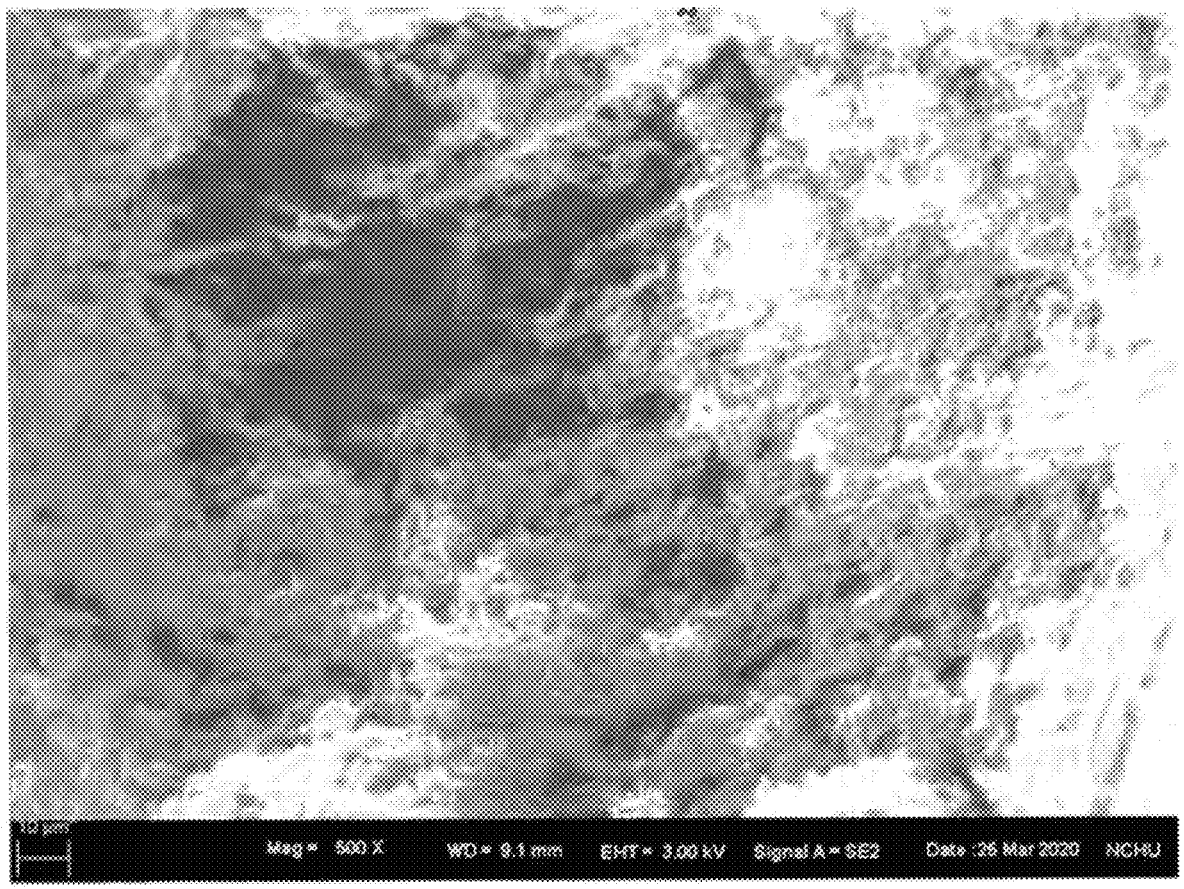
FIG. 7 is a magnified photo of a surface of the disposable eggshell eco-friendly material according to the present invention taken with an electron microscope.
Figure 8:
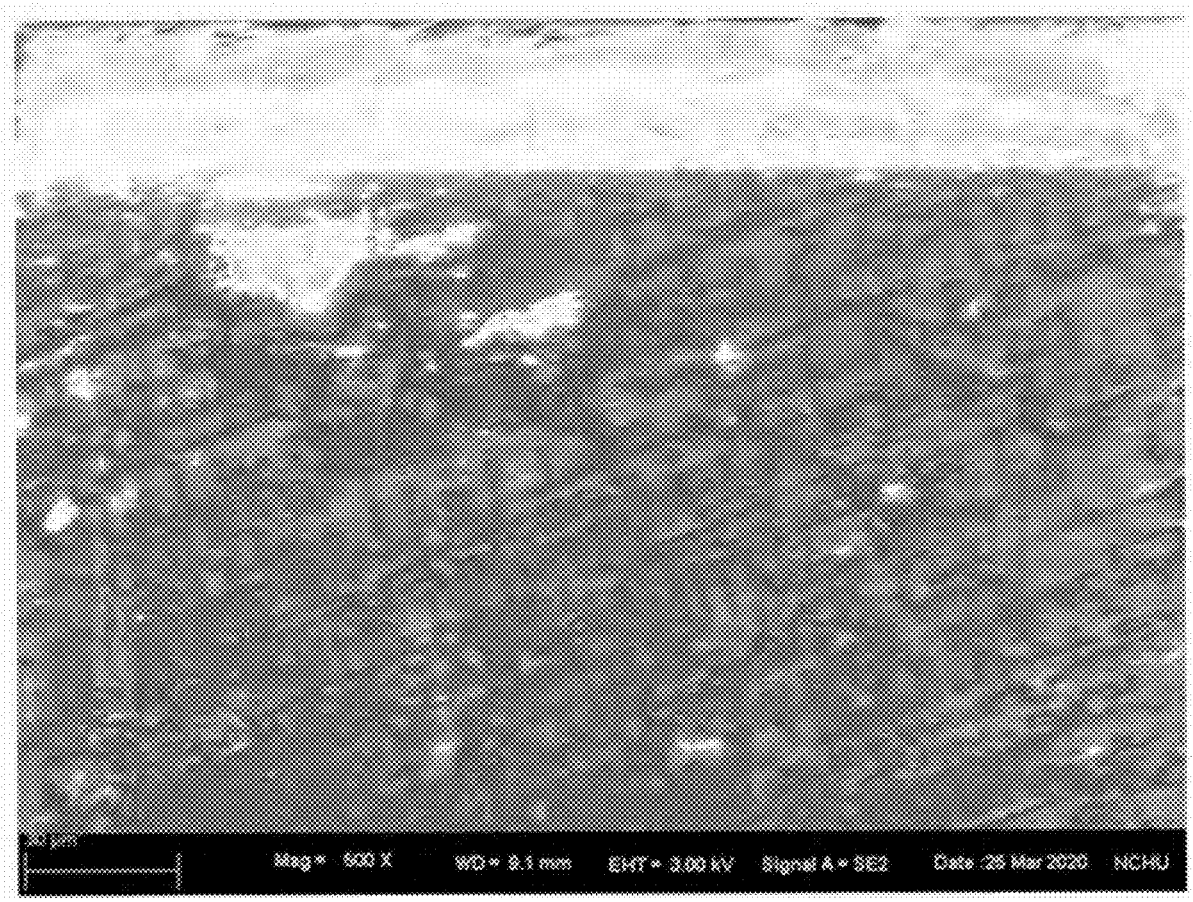
FIG. 8 is a magnified photo of a cross section of the disposable eggshell eco-friendly material according to the present invention taken with an electron microscope.
Figure 9:
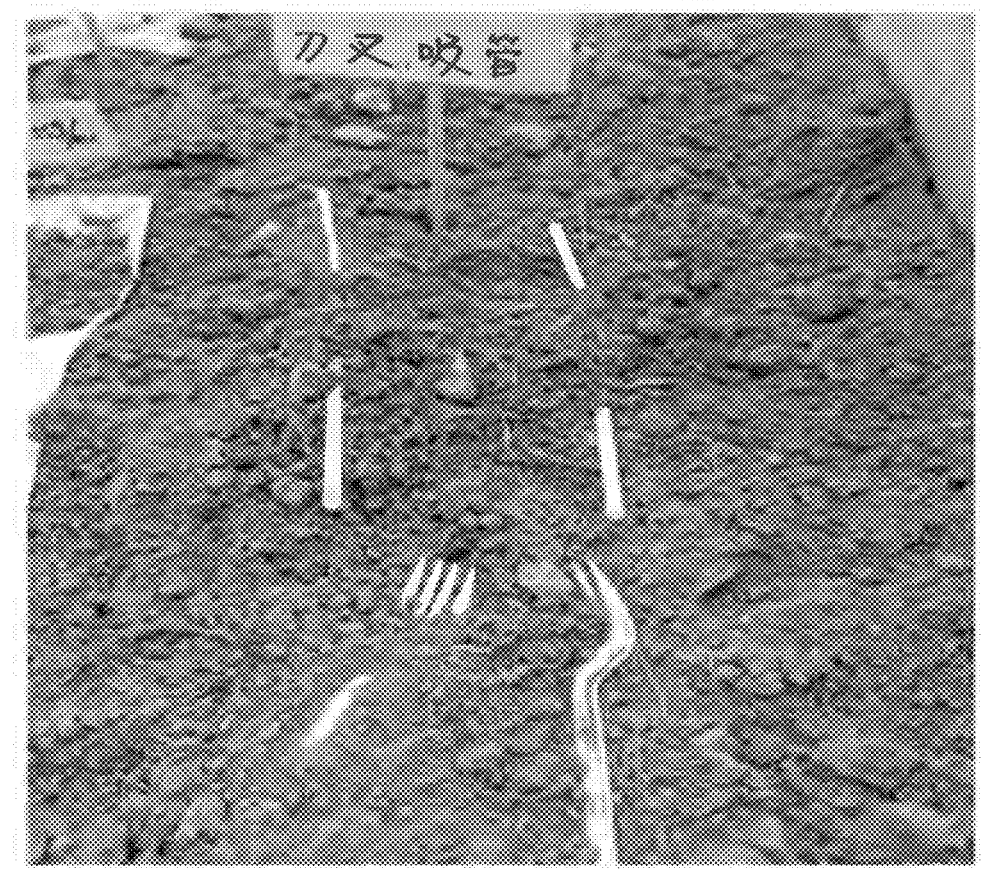
FIG. 9 is a photo showing environmental biodegradation in the field for forks and drinking straws of the disposable eggshell eco-friendly material products according to the present invention.
Figure 10:
FIG. 10 is a photo showing 30-day environmental biodegradation in the field for the forks and drinking straws of the disposable eggshell eco-friendly material products according to the present invention.
Figure 11:
FIG. 11 is a photo showing 60-day environmental biodegradation in the field for the forks and drinking straws of the disposable eggshell eco-friendly material products according to the present invention.
Figure 12:
FIG. 12 is a photo showing 90-day environmental biodegradation in the field for the forks and drinking straws of the disposable eggshell eco-friendly material products according to the present invention.

Referring further to FIGS. 7 and 8, photos obtained as being magnified by 500 times with an electron microscope, showing a surface and a cross section of a drinking straw of the disposable eggshell eco-friendly material product 130 manufactured with the above-discussed Steps 10-Steps 40 of the present invention, and it can be seen that the surface and the cross section of the drinking straw of the disposable eggshell eco-friendly material product 130 according to the present invention have a compact and tight structure, showing the drinking straw of the disposable eggshell eco-friendly material product 130 according to the present invention possess properties of being tougher and more water-resistant than a known paper-made drinking straw that is made of pulp or paper, and in view of such, Applicant has requested a local packaging company, Yupack Packaging Technology Co., Ltd., Taiwan, to carry out tensile strength tests, in Apr. 29, 2020, for the drinking straw of the disposable eggshell eco-friendly material product 130 according to the present invention and the known paper-made drinking straw of the same size (aperture 8 mm×length 200 mm), in which the drinking straw of the disposable eggshell eco-friendly material product 130 according to the present invention and the known paper-made drinking straw are both first soaked in water for 30 minutes and are then subjected to tests for tensile strengths thereof carried out with a tensile strength test machine, and the result shows the drinking straw of the disposable eggshell eco-friendly material product 130 according to the present invention has a tensile strength of 13.086 kgf/15 mm, and the known paper-made drinking straw has a tensile strength of only 3.181 kgf/15 mm, and it is apparent that the drinking straw of the disposable eggshell eco-friendly material product 130 according to the present invention, even being long soaked in water, still demonstrates a better tensile strength, meaning having bettered properties of toughness and water resistance, and further, Applicant has requested another local company, Applied Microtech Inc., Taiwan, to carry out inspection of contact angle, by using Phoenix Smart contact angle inspection machine, on the drinking straw of the disposable eggshell eco-friendly material product 130 according to the present invention and the known paper-made drinking straw having the same size (aperture 8 mm×length 200 mm), in order to identify water resistance value of the two, in which the drinking straw of the disposable eggshell eco-friendly material product 130 according to the present invention and the known paper-made drinking straw, before being soaked in water, are subjected to test and inspection for contact angle by using the above-mentioned contact angle inspection machine, and then, the two are soaked in water for 10 minutes and then subjected to inspection of the contact angle values by using the above-mentioned contact angle inspection machine, and the result shows the drinking straw of the disposable eggshell eco-friendly material product 130 according to the present invention demonstrates, both before and after being soaked in water for 10 minutes, values of contact angles that are respectively 74.44 and 68.48, while the known paper-made drinking straw demonstrates, before and after being soaked in water, values of contact angle that are respectively 116.2 and 24.44, meaning the drinking straw of the disposable eggshell eco-friendly material product 130 according to the present invention does not make a significant change of the contact angle before and after soaking in water, with only normal insignificant reduction, while the paper-made drinking straw, after being soaked in water, shows the value of contact angle being greatly reduced to an extremely low value of 24.22, this apparently indicating the drinking straw of the disposable eggshell eco-friendly material product 130 according to the present invention actually possesses a better property of water resistance in practical applications.

Further, since the drinking straw of the disposable eggshell eco-friendly material product 130 according to the present invention may be commonly used by a user to suck liquid or soup, Applicant has further requested SGS Taiwan Ltd to carry out inspection for heavy metals and non-toxicity (Report No. CV/2020/40107), in which inspections are carried out for heavy metals including cadmium (Cd), lead (Pb), mercury (Hg), hexavalent chromium (Cr6+) and non-toxicity inspection for polybrominated biphenyl (PBBs), polybrominated diphenyl ethers (PBDEs), and halogens), both tests showing positive result for being non-toxicant, and this indicates the drinking straw of the disposable eggshell eco-friendly material product 130 according to the present invention is safe for uses.

Figure 13:
FIG. 13 is a photo showing 120-day environmental biodegradation in the field for the forks and drinking straws of the disposable eggshell eco-friendly material products according to the present invention.
Figure 14:
FIG. 14 is a photo showing 150-day environmental biodegradation in the field for the forks and drinking straws of the disposable eggshell eco-friendly material products according to the present invention.
Figure 15:
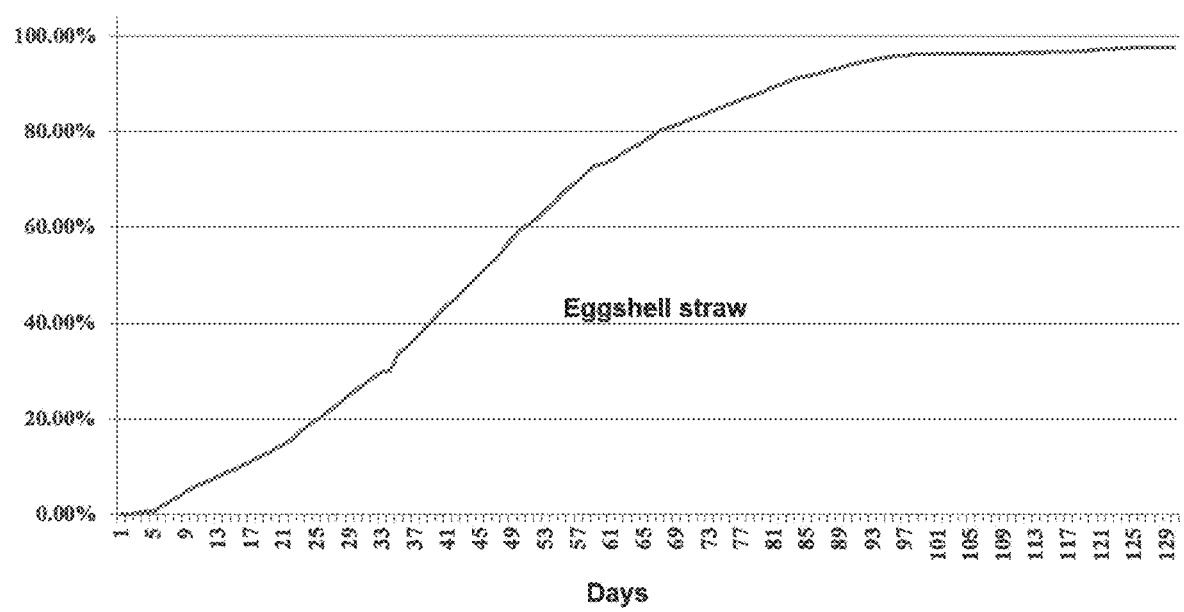
FIG. 15 shows a biodegradation percentage curve of the disposable eggshell eco-friendly material product according to the present invention.
Figure 16:
FIG. 16 is a photo showing environmental biodegradation in the field for a nonwoven fabric layer material of a medical oral mask of the disposable eggshell eco-friendly material product according to the present invention.
Figure 17:
FIG. 17 is a photo showing 30-day environmental biodegradation in the field for the nonwoven fabric layer material of the medical oral mask of the disposable eggshell eco-friendly material product according to the present invention.
Figure 18:
FIG. 18 is a photo showing 60-day environmental biodegradation in the field for the nonwoven fabric layer material of the medical oral mask of the disposable eggshell eco-friendly material product according to the present invention.

Referring further to FIGS. 9, 10, 11, 12, 13, 14, and 15, on-site field degradation tests are carried out on the fork of the disposable eggshell eco-friendly material product 100 and the drinking straw of the disposable eggshell eco-friendly material product 130 according to the present invention, wherein FIGS. 9, 10, 11, 12, 13, and 14 respectively show photos of the fork and the drinking straw of the disposable eggshell eco-friendly material products 100, 130 of the present invention taken at the commencement of the field tests, the 30th day of degradation, the 60th day of degradation, the 90th day of degradation, the 120th day of degradation, and the 150th day of degradation, respectively, and FIG. 13 shows after degradation for 120 days, the fork and the drinking straw of the disposable eggshell eco-friendly material products 100, 130 of the present invention reach a degradation percentage of more than 90%; and FIG. 14 shows, after degradation for 150 days, degradation of almost 100% has been reached. Further, a laboratory biodegradation experiment curve shown in FIG. 15 indicates the drinking straw of the disposable eggshell eco-friendly material product 130 of the present invention, after degradation of 120 days, shows a degradation percentage as high as 96-97%, and may ensure bettering of the soil environment and enhancing an effect of environmental protection and greening and beautifying, and further, assistance of accelerating growth of plants in the soil being greatly increased, and a nonwoven fabric layer material of the medical oral mask of the disposable eggshell eco-friendly material product 190 according to the present invention has been tested by SGS China, Guangzhou branch for verifying the result of degradation (Test Report No. GZCPCH190401165E-1), and degradation tests have been carried out according to GB/T 19275-2003 Plastic-evaluation of the biodegradation and disintegration action of microorganisms 8.4 soil-burial test (method C), performed at a regular temperature of 29° C. for a duration of 28 days, and a result of level 5 has been proven through the test of the nonwoven fabric layer material, the highest level of microorganism growth, indicating in a relatively short period of time, microorganisms from compost soil may quickly spread around the nonwoven fabric layer material for degradation, and further, in a period of cultivation for 28 days, a result of degradation that a reduction of 14.44% weight has been achieved for the degradation, meaning in a regular temperature or a natural environment temperature, the nonwoven fabric layer material of the medical oral mask of the disposable eggshell eco-friendly material product 190 according to the present invention requires no high temperature composting condition to achieve a higher and faster rate of degradation in even a natural environmental condition of regular temperature, and similarly, as natural degradation in soil, the above-discussed bettering of the soil environment and greening and beautifying, and further, assistance of accelerating growth of plants in the soil being achievable similar to those of the drinking straw of the disposable eggshell eco-friendly material product 130 according to the present invention.

Figure 19:
FIG. 19 is a photo showing 90-day environmental biodegradation in the field for the nonwoven fabric layer material of the medical oral mask of the disposable eggshell eco-friendly material product according to the present invention.
Figure 20:
FIG. 20 is a photo showing 120-day environmental biodegradation in the field for the nonwoven fabric layer material of the medical oral mask of the disposable eggshell eco-friendly material product according to the present invention.

Referring to FIGS. 16-20, on-site field degradation tests are carried out on the nonwoven fabric layer material of the medical oral mask of the disposable eggshell eco-friendly material product 190 according to the present invention, wherein FIGS. 16, 17, 18, 19, and 20 respectively show photos of the nonwoven fabric layer material of the disposable eggshell eco-friendly material product 190 of the present invention taken at the commencement of the field tests, the 30th day of degradation, the 60th day, the 90th day of degradation, and the 120th day of degradation, and FIG. 19 shows after degradation for 90 days, the nonwoven fabric layer material of the medical oral mask of the disposable eggshell eco-friendly material product 190 according to the present invention reaches a degradation percentage of more than 90%; and FIG. 20 shows, after degradation for 120 days, degradation of almost 100% has been reached, and this echoes and proves the above-mentioned result of laboratory degradation tests for the nonwoven fabric layer material of the medical oral mask of the disposable eggshell eco-friendly material product 190 according to the present invention. Similarly, the other examples of chopsticks, spoon, toothbrush, forceps, hook, mirror, and N95 mask of the disposable eggshell eco-friendly material product 110, 120, 140, 150, 160, 170, 180, 200 according to the present invention provide a similar result of degradation and bettering of soil environment, and enhancing of greening and beautifying, and further, providing high assistance of accelerating growth of plants in the soil.

The above provides a disposable eggshell eco-friendly material and manufacturing method according to the present invention as shown in FIGS. 1-20, and the disclosure and drawings so provided are for expounding and illustrating the technical contents and technical solution according to the present invention, and the illustrative embodiments so provided are not intended to limit the scope thereof, and further, minute or minor structural modification or equivalent substitute of components of the present invention are considered all within the scope of the present invention that is defined solely by the appended claims.

What is claimed is:

1. A disposable eggshell eco-friendly material, comprising, for volume ratio, 50%-80% of calcined eggshell powder, 10%-48% of biodegradable polymer, 1%-5% of natural degradation agent, and 1%-5% of natural binding agent, which are subjected to a mixing and stirring step according to the ratio, and then subjected to a pelletizing step to be first prepared as a plurality of disposable eggshell eco-friendly material pellets, and the disposable eggshell eco-friendly material pellets being then subjected to a shaping and forming step by means of one of film blowing, extruding, vacuum forming, bottle blowing, injecting, and drawing, to obtain a disposable eggshell eco-friendly material product that is disposed of after one time of use.

2. The disposable eggshell eco-friendly material according to claim 1, wherein the calcined eggshell powder is selected as an eggshell powder that is subjected to high temperature calcination in a heating rotary kiln of 800° C.-1000° C. for 30 minutes to 60 minutes under a condition that nitrogen flow rate is controlled at 100-300 ml/min and has a mesh number of 400 mesh and an average particle size of 5.236 micrometers and a maximum particle size less than 35.316 micrometers.

3. The disposable eggshell eco-friendly material according to claim 1, wherein the biodegradable polymer is selected as one or a combined polymer of two or three of polylactic acid (PLA), polybutylene succinate (PBS), polybutylene succinate adipate (PBSA), polybutylene adipate terephthalate (PBAT), polylactide aliphatic polyester copolymer (CPLA), polycaprolactone (PCL), polyhydroxyalkanoate (PHA), starch-based polymer, cellulose acetate, polyvinyl acetate (PVA), polyvinyl alcohol (PVOH), aliphatic-aromatic polyester copolymer, and aliphatic polyester.

4. The disposable eggshell eco-friendly material according to claim 1, wherein the natural degradation agent is selected as being made of an eggshell membrane.

5. The disposable eggshell eco-friendly material according to claim 4, wherein the eggshell membrane of the natural degradation agent contains 20% of water, 70% of protein, and 10% of ash.

6. The disposable eggshell eco-friendly material according to claim 5, wherein the protein of the eggshell membrane of the natural degradation agent has a primary ingredient comprising approximately 70-75% of membrane protein, which has a structure formed by connecting linear structures with lysine, and a remaining portion of the protein is formed of 10% of collagen and 15%-20% of glycoprotein.

7. The disposable eggshell eco-friendly material according to claim 5, wherein the eggshell membrane of the natural degradation agent is taken as dried eggshell membrane powder obtained from waste eggshell that is subjected to hydrolysis and extraction.

8. The disposable eggshell eco-friendly material according to claim 1, wherein the natural binding agent is selected as one or a combination of at least two of seaweed gum, Arabic gum, guar gum, and konjac gum.

9. The disposable eggshell eco-friendly material according to claim 1, wherein the natural binding agent comprises a plant gum.

10. The disposable eggshell eco-friendly material according to claim 1, wherein the natural binding agent comprises a dry powder.

11. A disposable eggshell eco-friendly material manufacturing method, comprising the following steps:
(A) material mixing and stirring, in which, for volume ratio, calcined eggshell powder of 50%-80%, a biodegradable polymer of 10%-48%, a natural degradation agent of 1%-5%, and a natural binding agent of 1%-5% are uniformly mixed and stirred;
(B) preparation for pelletizing, in which the material that has been subjected to material mixing and stirring in step (A) is subjected to extrusion pelletizing treatment to prepare a plurality of disposable eggshell eco-friendly material pellets;
(C) shaping and forming, the disposable eggshell eco-friendly material pellets prepared in step (B) is subjected to treatment of one of film blowing, extruding, vacuum forming, bottle blowing, injecting, and drawing at a temperature of 110° C.-180° C.; and
(D) forming of disposable eggshell eco-friendly material, in which after the treatment of the shaping and forming step of step (C), a disposable eggshell eco-friendly material product is formed.

12. The disposable eggshell eco-friendly material manufacturing method according to claim 11, wherein the calcined eggshell powder of step (A) is selected as an eggshell powder that is subjected to high temperature calcination in a heating rotary kiln of 800° C.-1000° C. for 30 minutes to 60 minutes under a condition that nitrogen flow rate is controlled at 100-300 ml/min and has a mesh number of 400 mesh and an average particle size of 5.236 micrometers and a maximum particle size less than 35.316 micrometers.

13. The disposable eggshell eco-friendly material manufacturing method according to claim 11, wherein the biodegradable polymer of step (A) is selected as one or a combined polymer of two or three of polylactic acid (PLA), polybutylene succinate (PBS), polybutylene succinate adipate (PBSA), polybutylene adipate terephthalate (PBAT), polylactide aliphatic polyester copolymer (CPLA), polycaprolactone (PCL), polyhydroxyalkanoate (PHA), starch-based polymer, cellulose acetate, polyvinyl acetate (PVA), polyvinyl alcohol (PVOH), aliphatic-aromatic polyester copolymer, and aliphatic polyester.

14. The disposable eggshell eco-friendly material manufacturing method according to claim 11, wherein the natural degradation agent of step (A) is selected as an eggshell membrane.

15. The disposable eggshell eco-friendly material manufacturing method according to claim 14, wherein the eggshell membrane of the natural degradation agent of step (A) contains 20% of water, 70% of protein, and 10% of ash.

16. The disposable eggshell eco-friendly material manufacturing method according to claim 15, wherein the protein of the eggshell membrane of the natural degradation agent of step (A) has a primary ingredient comprising approximately 70-75% of membrane protein, which has a structure formed by connecting linear structures with lysine, and a remaining portion of the protein is formed of 10% of collagen and 15%-20% of glycoprotein.

17. The disposable eggshell eco-friendly material manufacturing method according to claim 15, wherein the eggshell membrane of the natural degradation agent of step (A) is taken as dried eggshell membrane powder obtained from waste eggshell that is subjected to hydrolysis and extraction.

18. The disposable eggshell eco-friendly material manufacturing method according to claim 11, wherein the natural binding agent of step (A) is selected as one or a combination of at least two of seaweed gum, Arabic gum, guar gum, and konjac gum.

19. The disposable eggshell eco-friendly material manufacturing method according to claim 11, wherein the natural binding agent of step (A) comprises a plant gum.

20. The disposable eggshell eco-friendly material manufacturing method according to claim 11, wherein the natural binding agent of step (A) comprises a dry powder.

21. The disposable eggshell eco-friendly material manufacturing method according to claim 11, wherein a step of preparing the calcined eggshell powder in step (A) comprises:
(A1) eggshell waster washing and sterilizing, in which an outside surface and an interior of an eggshell selected from wastes is subjected to washing with water and sterilizing treatment;
(A2) drying treatment, in which the eggshell that has been subjected to the washing treatment in step (A1) is subjected to drying at a temperature of 110° C.-150° C.;
(A3) grinding and sieving, in which the eggshell that has been subjected to the drying treatment in step (A2) is placed in a grinding machine for pulverizing and grinding into powder and is then subjected to sieving with a 400-mesh sieve to obtain primitive eggshell powder;
(A4) calcinating treatment, in which the primitive eggshell powder that has been subjected to the grinding and sieving treatment in step (A3) is placed in a heating rotary kiln, and the heating rotary kiln is operated at operation conditions of nitrogen flow rate being controlled at 100-300 ml/min, 800° C.-1000° C., a rotational speed of 2-4 RPM, and a time period of 30 minutes to 60 minutes for carrying out calcinating treatment; and (A5) forming eggshell powder in white powder form, in which calcined eggshell powder product in the form of white powder is obtained after the step of calcinating treatment in step (A4), having an average particle size of 5.236 micrometers and a maximum particle size less than 35.316 micrometers.

22. The disposable eggshell eco-friendly material manufacturing method according to claim 21, wherein eggshell waster washing and sterilizing of step (A1) of the step of preparing the calcined eggshell powder in step (A) is carried out by having the eggshell powder that that has been subjected to 800° C.-1000° C. calcination is mixed with fresh water, a concentration of 0.1-10 g/1000 ml being taken for washing and sterilizing of the eggshell.

23. The disposable eggshell eco-friendly material manufacturing method according to claim 21, wherein the eggshell of step (A1) of the step of preparing the calcined eggshell powder in step (A) is selected as an eggshell of a poultry egg.

24. The disposable eggshell eco-friendly material manufacturing method according to claim 21, wherein the eggshell of step (A1) of the step of preparing the calcined eggshell powder in step (A) is handled with an automatic egg opening machine to automatically separate contents of the egg and the eggshell.

25. The disposable eggshell eco-friendly material manufacturing method according to claim 11, wherein the step of preparation for pelletizing in step (B) comprises extrusion pelletizing treatment performed with a dual-screw extruder.

\* \* \* \* \*